United States Patent
Gerritsen et al.

[15] 3,650,595
[45] Mar. 21, 1972

[54] REDUNDANT, SPECKLE-FREE HOLOGRAM RECORDING APPARATUS

[72] Inventors: Hendrik J. Gerritsen, Providence, R.I.; William J. Hannan, Pennington, N.J.

[73] Assignee: Radio Corporation of America

[22] Filed: Apr. 24, 1970

[21] Appl. No.: 29,748

Related U.S. Application Data

[63] Continuation of Ser. No. 662,822, Aug. 23, 1967, abandoned.

[52] U.S. Cl. ............................................350/3.5, 350/162 R
[51] Int. Cl. .......................................................G02b 27/00
[58] Field of Search.........................................350/3.5, 162 R

[56] References Cited

OTHER PUBLICATIONS

Martienssen et al., Physics Letters, Vol. 24A, No. 2, Jan, 1967, pp. 126–128.

Stroke et al., Physics Letters, Vol. 15, No. 3, April, 1965, pp. 238–240.

Primary Examiner—David Schonberg
Assistant Examiner—Ronald J. Stern
Attorney—Edward J. Norton

[57] ABSTRACT

There is disclosed the use of a phase diffraction, rather than a plate of diffusing glass, for introducing redundancy into the information beam which is employed together with a reference beam in recording a hologram. The use of a phase diffraction grating eliminates the presence of unwanted speckle noise in the reproduced image of the hologram, which speckle noise is present to a large degree when a small sized hologram is recorded with a diffused light information beam.

10 Claims, 4 Drawing Figures

INVENTORS
HENDRIK J. GERRITSEN
WILLIAM J. HANNAN
BY Edward J. Norton
ATTORNEY

REDUNDANT, SPECKLE-FREE HOLOGRAM RECORDING APPARATUS

This is a continuation of my copending application Ser. No. 662,822, filed Aug. 23, 1967 and now abandoned.

This invention relates to hologram recording apparatus and, more particularly, to such apparatus for recording microholograms which have a significant amount of redundancy but no unwanted speckle noise.

Hologram recording, as known in the art, consists of exposing an area of a recording medium, such as a photographic film, to an information beam from an object illuminated with spatially coherent electromagnetic waves, such as a laser light, and simultaneously directly exposing the same given area to a reference beam of the aforesaid spatially coherent electromagnetic waves. This results in an interference pattern formed by the information beam and the reference beam being recorded on the given area of the recording medium.

Where the illuminated object is a transparency, such as a photographic slide, any scratches or dirt spots present on the recording medium upon reconstruction of an image from a recorded hologram, will cause complete loss of small portions of the image when no redundancy is provided in the information beam during the recording of the hologram. However, if sufficient redundancy is provided in the information beam during the recording of a hologram, the recorded hologram can be severely scratched, spotted with dirt, and even broken into pieces without causing more than a slight loss in overall resolution and contrast in the reproduced image. Usually a slight overall degradation in the reproduced image is preferable to a complete loss of small portions of the image. For this reason redundant holograms are attractive for data recording and display applications.

In the prior art, this desired redundancy is achieved by utilizing an information beam composed of diffused light in recording the hologram. More specifically, it is the practice to pass a beam of spatially coherent light through a plate of diffusing glass, such as opal glass, prior to shining it through a transparency having thereon information to be recorded. This results in each point of the given area of the recording medium being illuminated with light from all points on the transparency, as well as with the light from the reference beam. Therefore, a high degree of redundancy is achieved in the recorded hologram. On the other hand, if the diffusing glass is eliminated, light in the information beam reaching any particular point of a given area of the recording medium is obtained solely from corresponding particular single points of the transparency, the correspondence being on a one-to-one basis. In this latter case, no redundancy is present in the recorded hologram and any slight scratch or dirt spot on the hologram recording causes a complete loss of a specific small portion of the reproduced image.

Unfortunately, there is a price which must be paid for the scratch immunity afforded by diffused information beam holograms. The price is paid either in accepting "speckle" background noise or in using very large holograms that are not plagued by speckle noise.

Speckle noise is an unwanted byproduct of highly coherent light, such as laser radiation, when it is diffusely reflected. The bright speckles correspond to the constructive interference of the diffusely reflected light while the dark speckles correspond to the destructive interference. Since a diffuse reflecting surface has completely random characteristics, the observed speckle noise also has random characteristics. The appearance of speckle noise in a reproduced hologram is similar to that of grain noise found in a photographic image or print.

A good approximation of the signal-to-speckle noise power ratio of a diffused hologram is given by the ratio of the area of the smallest spot diameter that can be reproduced from a hologram considering the entire recording and reproducing system to the smallest spot diameter that can be reproduced from a hologram taking into consideration only the diffraction limit.

Since a large hologram has a very small diffraction limit, while a small hologram has a relatively large diffraction limit, speckle noise is much more apparent in small holograms than it is in large holograms. However, to obtain a high information packing density in the recording of holograms, just as in the case of recording conventional microfilms, it is most desirable to make the area of a hologram recording quite small. A small area hologram, having an area no greater than ten square millimeters and preferably in the order of one square millimeter, is defined for use herein as a microhologram.

On one hand, it will be seen that a small scratch or dirt spot on a microhologram recording without redundancy can be tolerated to a much less extent than such scratches or dirt spots in a large-size hologram recording. On the other hand, the recording of redundant microholograms by the use of a conventional diffused information beam results in a large amount of undesired speckle noise being present in the reproduced image.

It is therefore an object of the present invention to provide a system for recording holograms and, in particular, microholograms which contain adequate redundancy while at the same time being capable of reproducing images free from observable speckle.

It is a feature of the present invention to utilize a phase diffraction grating, which is preferably a two-dimensional phase diffraction grating, rather than a plate of diffusing glass, for producing sufficient redundancy in the information beam utilized in recording a hologram; the line spacing of the phase diffraction grating being sufficiently small to cause the maximum spacing between adjacent maxima or adjacent minima in a noise interference pattern resulting from the presence of the grating to be no greater than the resolution limit of the hologram recording apparatus.

These and other objects, features and advantages of the present invention will become more apparent from the following detailed description taken together with the accompanying drawing in which.

Figure 1:
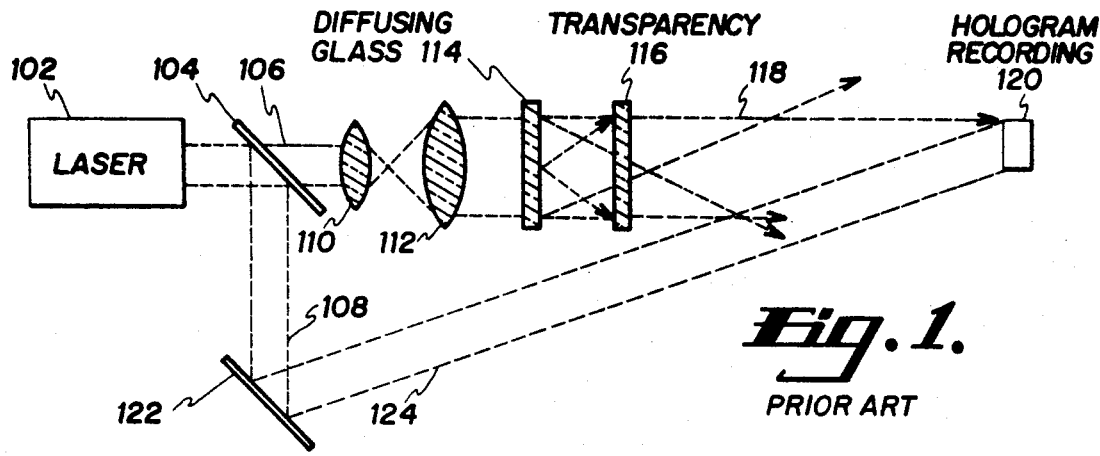
FIG. 1 is a block diagram of a conventional prior art system for recording holograms utilizing a diffusing glass as a diffuser.

FIG. 1 shows the conventional prior art system for recording a hologram of a two-dimensional object, such as the information on a transparency. In particular, as shown in FIG. 1 a beam 100 of coherent light from a laser 102 is divided by beam splitting mirror 104 into a first component beam 106 and a second component beam 108. First component beam 106, after being enlarged by lenses 110 and 112 is directed through diffusing glass 114 to produce diffused randomly directed light rays, shown in FIG. 1 by the arrows emanating from diffusing glass 114, which point in various directions. In the path of this diffused light is transparency 116, which modulates the intensity of the light passing therethrough to form information beam 118. At least some of information beam 118 is permitted to impinge on a predetermined area of hologram recording medium 120.

Second component beam 108, after being reflected from mirror 122, forms reference beam 124, which also impinges upon the same given area of hologram recording medium 120 as does information beam 118. Since information beam 118 and reference beam 124 are both obtained from beam 100 emanating from laser 102, which is a spatially coherent light source, a hologram interference pattern defining the information on transparency 116 in coded form is recorded on hologram recording medium 120.

As well known in the art, when such a recorded hologram is viewed with a readout beam, there are formed a pair of first order diffraction spectra, a particular one of which forms a real image of the information present on transparency 116 and the other particular one of which forms a virtual image of this information.

Due to the fact that hologram recording 120, shown in FIG. 1, was made with a diffused information beam, due to the presence of diffusing glass 114, rather than with a non-diffused light information beam, which would be the case if diffusing glass 114 had been omitted, any scratches, small dirt spots, etc., present on hologram recording 120 at the time it is read out will not result in the loss of any entire portion of the information on transparency 116. Instead, such scratches, small dirt spots, etc., will only cause a slight degradation in the intensity and resolution of the entire reconstructed image. On the other hand, when a non-diffused light information beam is utilized, actual loss of specific portions of pieces of information in transparency 116 result from the presence, of scratches, small dirt spots, etc., on hologram recording 120. However, when hologram recording 120 is a microhologram having an area of no greater than 10 square millimeters and usually in the order of 1 square millimeter, the reconstructed image of a hologram made with a diffused information beam contains undesired speckle, which looks like objectionable graininess in a photographic reproduction.

Figure 2:
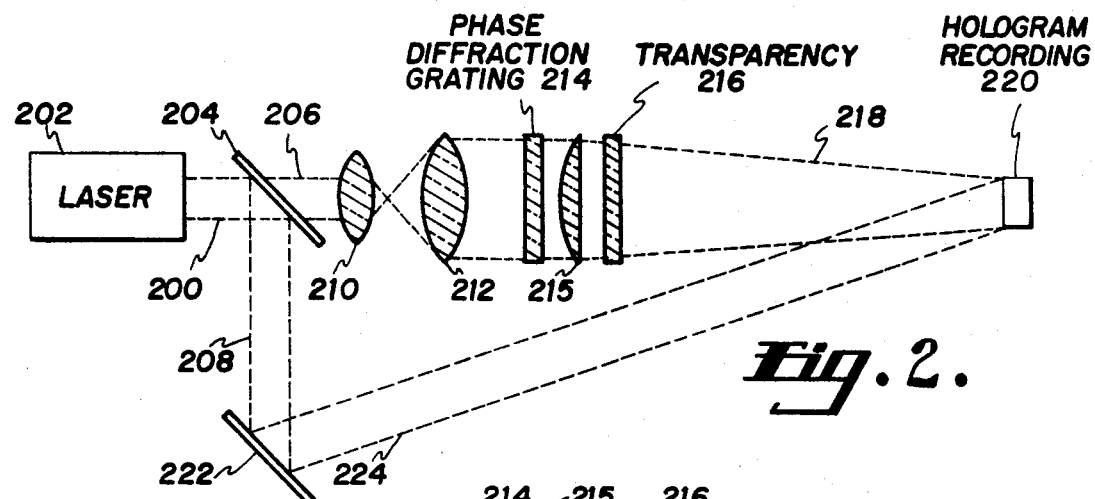
FIG. 2 is a block diagram of a preferred embodiment of the present invention.

Referring to FIG. 2, there is shown the hologram recording system of the present invention. In FIG. 2, elements 202, 204, 210, 212, 216, 220 and 222 and beams 200, 206, 208 and 224 correspond respectively with each of elements 102, 104, 110, 112, 116, 120 and 122 and beams 100, 106, 108 and 124 of FIG. 1. However, diffusing glass 114 and diffused light information beam 118 of FIG. 1 are replaced in FIG. 2 by a phase diffraction grating 214 together with lens 215 to form converging information beam 218.

The multiple beams on which this invention is based, can be generated in two ways; i.e., either a combination of mirrors and beamsplitters or a diffraction grating. The diffraction grating can cause a change of transmitivity or of phase of the electromagnetic waves going through it. Although all these methods are included in the basic idea of this invention, the phase grating is the most convenient and quite efficient method and is thus used in the text to describe the multi beam device of this invention.

Figure 3:
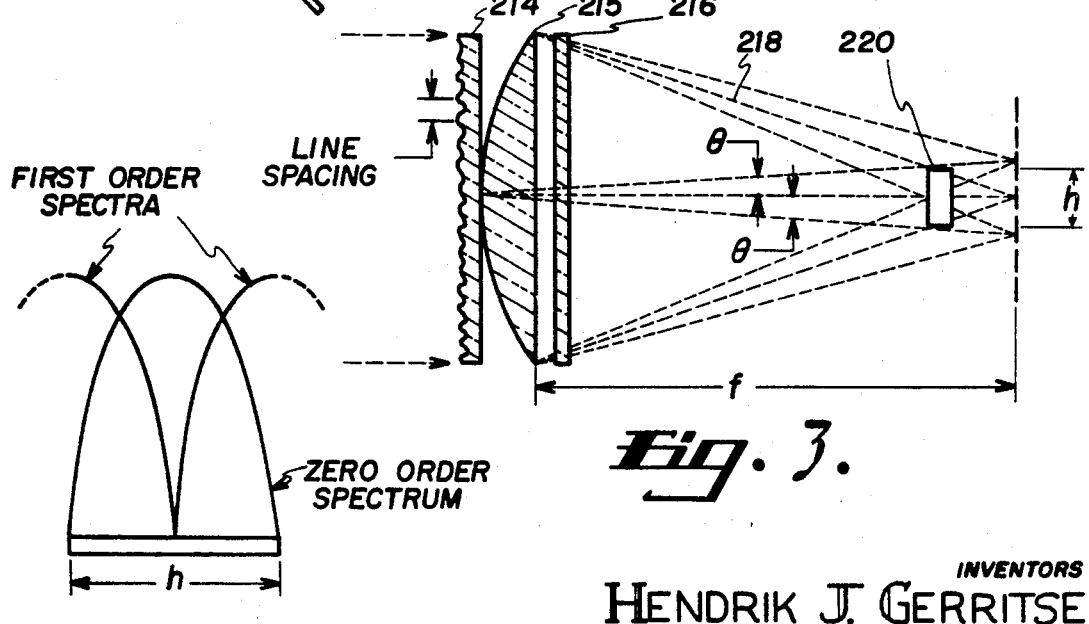
FIG. 3 shows in detail a portion of the embodiment shown in FIG. 2.

Phase diffraction grating 214 along with lens 215, information beam 218, transparency 216 and hologram recording 220 are shown in more detail in FIG. 3. Phase diffraction grating 214 is preferably a two-dimensional grating. Therefore, FIG. 3 corresponds to top view of phase diffraction grating 214, lens 215 and information beam 218 or in the case of a two-dimensional phase grating to a side view of these items as well.

Phase diffraction grating 214, as shown in FIGS. 2 and 3 comprises a transparent material having a given index of refraction different from that of its surroundings, such as air, whose thickness varies in at least one direction and preferably in each of two orthogonal directions. This variation in thickness, as shown in FIG. 3, is in accordance with a periodic function, with a very large number of periods being present over the entire extent of a given dimension of the grating. For reasons which will be brought out below, it is preferable, but not essential, that the periodic function of the variation in the thickness of the grating be sinusoidal. In any case, the period of periodic function is equal to the line spacing of the grating.

Although the phase diffraction grating shown in FIG. 3 is achieved by variation in the thickness of a material having a constant index of refraction, it will be apparent to those skilled in the art that a phase diffraction grating can be made by utilizing a material of constant thickness in which the index of refraction thereof varies periodically for each line spacing thereof. Also a variation in the index of refraction and a variation in the thickness of the material may be properly combined to form a phase diffraction grating. Also, to provide a desired energy distribution in the diffracted beams it may be desirable to use other than sinusoidal variations. It may even be desirable in some cases to use a combination of transmission and phase variation to form the grating.

The presence of phase diffraction grating 214 along with lens 215 will cause a pair of first order diffraction spectra, as well as a zero order diffraction spectra to be formed. As shown in FIG. 3, the respective centers of each of the pair of first order spectra are symmetrically disposed about the center of the zero order spectrum at an angle of $\theta$.

The size of angle $\theta$ depends both on the number of grating lines per unit distance (the spatial wavelength of each period of the phase diffraction grating) and the amount of convergence provided by lens 215. However, the presence of a phase diffraction grating will produce an unwanted or noise interference pattern in the recorded hologram, which noise interference pattern has a spatial wavelength (the spacing between adjacent maxima or adjacent minima in the noise interference pattern) which is proportional to the line spacing of the phase grating. This noise interference pattern can be effectively eliminated from the recorded hologram, so that no grating lines will appear in the reproduced image, by making the line spacing of the phase grating sufficiently small so that the spatial wavelength of the recorded noise interference pattern is no greater than the resolution limit of the overall system. Since, for other reasons to be brought out below, it is desirable to make the line spacing as large as possible, the line spacing of the phase grating should be made just at or slightly below the resolution limit of the overall recording system, rather than much less than the resolution limit of the overall recording system.

It is further desired to produce as much redundancy in the recorded hologram interference pattern as is possible without permitting grating lines to appear in the reproduced image. It will be seen from FIGS. 3 and 4 that if the size of a given dimension of recording hologram 220 is $h$, the value of angle $\theta$ should be such that the maximum point of the zero order spectrum coincides with the midpoint of dimension $h$, while the maximum point of each of the two first order spectra coincides with the respective opposite ends of dimension $h$. The focal length $f$ of lens 215, shown in FIG. 3, is made such that angle $\theta$ has this proper value when the line spacing of phase grating 214 is just at the resolution limit of the overall hologram recording system.

Figure 4:
FIG. 4 is a graph showing the relative intensities of the zero order spectrum and each of the first order spectra over a given dimension of the hologram recording shown in FIGS. 2 and 3.

It can be shown that when the position of each of the first order spectra and the zero order spectrum is that shown in FIG. 4, and the maximum value of each of the first order spectra is equal to the maximum value of the zero order spectrum, the hologram interference pattern can have a redundancy of as much as two for each orthogonal dimension of the phase grating. Thus, if a two-dimensional phase grating is utilized, there can be produced a total redundancy of four. In the case of a two-dimensional phase grating, the area of the hologram recording will include a total of nine spectra distributed over the given area of the hologram recording. However, as shown in FIG. 4, only one-half of each first order spectra is within the given area of the recorded hologram.

The redundancy introduced into the recorded hologram may be increased to more than four by increasing the line spacing of the phase grating. However, if the line spacing is increased to greater than the resolution limit of the overall recording system, the grating lines would be resolvable in the reproduced image. On the other hand, reducing the line spacing even further below the resolution limit of the overall system would gain no advantage in reducing noise, but would merely reduce the redundancy introduced into the recorded hologram. For this reason, the relationship between the first order spectra and the zero order spectrum shown in FIG. 4, which gives a redundancy of four when used with a two-dimensional phase grating, or a redundancy of two when utilized with a one-dimensional phase grating, is the optimum relationship.

In order to make the maximum of each of the first order spectra equal to the maximum of the zero order spectrum, as shown in FIG. 4, it is desirable that the periodic function of the phase grating be sinusoidal. However, it is difficult to fabricate a phase diffraction grating in which the thickness varies over each line spacing in accordance with a sinusoidal function. In practice, therefore, phase diffraction gratings are often cut so that the thickness between line spacing varies in accordance with a more or less triangular or trapezoidal type function.

Although this reduces the effective redundancy introduced in the recorded holograms somewhat, one gains in simplicity in cutting the phase diffraction grating.

Although in the preferred embodiment of the invention described above, a phase diffraction grating is used to obtain a plurality of information beams, namely, the zero order and first order diffraction beams shown in FIG. 3, such a plurality of information beams may be alternatively obtained from other devices, such as beam splitters or optical tunnels, for instance, as mentioned previously. It is therefore intended that the present invention include all devices capable of producing a plurality of angularly spaced overlapping information beams, such as shown in FIG. 4, to provide redundancy in the recorded hologram interference pattern, while at the same time introducing noise into the hologram interference pattern which has a maximum spatial wavelength no greater than the ultimate resolution limit of the hologram recording system.

What is claimed is:

1. In an apparatus for recording a hologram of given area and given dimensions on a recording medium, wherein said apparatus comprises first means for exposing said given area to an information beam from an object illuminated with spatially coherent electromagnetic waves and second means for simultaneously exposing said given area to a reference beam of said spatially coherent electromagnetic waves to thereby produce on said area a hologram interference pattern between said information and said reference beam, and wherein an image of said object is capable of being reconstructed from said recorded hologram with a certain ultimate resolution limit; the improvement wherein said first means includes information redundancy means for simultaneously producing a plurality of discrete angularly spaced overlapping information beams, the spacing of said simultaneously-produced overlapping beams being sufficiently small to cause the maximum spatial wavelength in a noise interference pattern resulting from the presence of said redundancy means to be no greater than said resolution limit.

2. The apparatus defined in claim 1 wherein said redundancy means comprises a phase diffraction grating.

3. The apparatus defined in claim 2, wherein said phase diffraction grating is two dimensional.

4. The apparatus defined in claim 1, wherein said redundancy means includes means for diffracting the information beam impinging on said recording medium by an angular amount with respect to said given dimensions to provide a zero-order beam symmetrically disposed about the bisector of a given dimension of said hologram and each of two first-order beams symmetrically disposed about each respective opposite one of the ends of that given dimension of said hologram.

5. The apparatus defined in claim 4, wherein the relative intensities of said zero-order beam and each of said first-order beams are all substantially equal.

6. The apparatus defined in claim 4, wherein said given area is no greater than ten square millimeters.

7. The apparatus defined in claim 6, wherein said given area is in the order of one square millimeter.

8. The apparatus defined in claim 4, wherein said hologram is a micro-hologram, and wherein said first means includes a transparency having information thereon which transparency is of a size larger than said microhologram, a phase diffraction grating, a convex lens, and means for transmitting said spatially coherent electromagnetic waves through said grating, said lens and said transparency in that order to obtain a convergent information beam which impinges on said given area of said recording medium.

9. The apparatus defined in claim 8, wherein phase diffraction grating has a given line spacing which causes a noise interference pattern to be generated over said given area of said recording medium, said given line spacing being sufficiently small to cause the maximum spacing in said noise interference pattern to be no greater than said resolution limit.

10. The apparatus defined in claim 9, wherein said phase diffraction grating is a sinusoidal phase diffraction grating.

* * * * *